United States Patent [19]
Hannivig

[11] 3,806,699
[45] Apr. 23, 1974

[54] HEATED LUNCH BOX

[76] Inventor: Ronald T. Hannivig, 2525 Key Largo Ln., Ft. Lauderdale, Fla. 33312

[22] Filed: Aug. 14, 1972

[21] Appl. No.: 280,247

[52] U.S. Cl............ 219/387, 99/171 H, 126/262, 219/428, 219/432, 219/433, 219/439, 219/521, 219/533, 220/17
[51] Int. Cl.................. A21b 1/52, F27d 11/02
[58] Field of Search .......... 219/385, 386, 428, 387, 219/438, 439, 432, 433, 521, 533; 126/246, 262, 375; 220/17, 13, 23, 83, 1; 99/171 H

[56] References Cited
UNITED STATES PATENTS

| | | | |
|---|---|---|---|
| 859,850 | 7/1907 | Sliga | 126/246 X |
| 1,534,087 | 4/1925 | Sellew et al. | 219/386 |
| 2,210,521 | 8/1940 | Bemis | 99/448 X |
| 3,610,884 | 10/1971 | Evans et al. | 219/439 |
| 1,022,290 | 4/1912 | Anderson | 220/13 |
| 2,582,735 | 1/1952 | Alaj | 126/246 |
| 3,034,499 | 5/1962 | Scavullo | 126/375 |
| 3,126,882 | 3/1964 | Hilfiker | 219/385 X |
| 3,608,627 | 9/1971 | Shevlin | 219/521 UX |

FOREIGN PATENTS OR APPLICATIONS

| | | | |
|---|---|---|---|
| 246,887 | 2/1926 | Great Britain | 219/387 |
| 378,492 | 8/1932 | Great Britain | 219/386 |

Primary Examiner—Volodymyr Y. Mayewsky

[57] ABSTRACT

A lunch box, having a plurality of separable food and beverage storage chambers, a flush pouring spout and an immersible thermal unit for heating food within said chambers. All chambers are separable from each other to allow breakdown of the box for ease of cleaning, while providing for segregation of various foods and beverages when coupled together.

2 Claims, 1 Drawing Figure

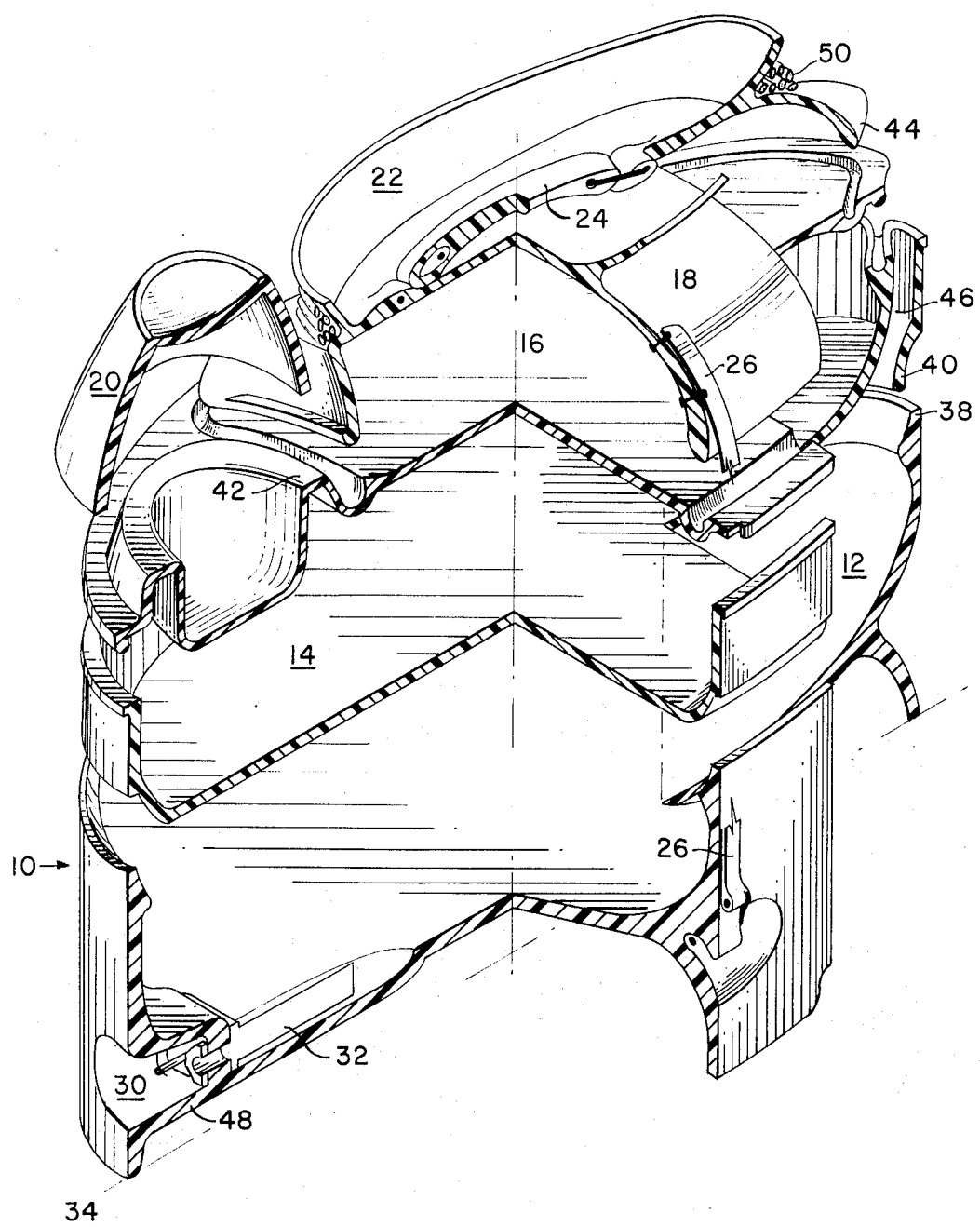

HEATED LUNCH BOX

BACKGROUND OF THE INVENTION

This invention relates generally to containers for carrying food and drink that is to be consumed at a later time, and more specifically, to a heatable lunch box having a plurality of individual chambers for storing and heating both liquids and solid foods, while providing a breakdown lunch box divisible into separate parts for easy cleaning. The lunch box can also serve in the home as: a double boiler and for heating frozen dinners without the expense and excess heat of an oven. It is also a convenient way to save and serve a meal for a member of the family who arrives late for supper. In the past, a lunch pail meant eating a cold lunch with the only warm food being provided by perhaps a vacuum insulated bottle. Prior heated lunch boxes have been made that have proven unsatisfactory for various reasons including bulkiness, inability to heat all the contents of the box, poor dispensing qualities and undesirable cleaning characteristics.

BRIEF DESCRIPTION OF THE INVENTION

A heated food and beverage storage and carrying device having a plurality of severable food storing chambers, said chamber coupled together to form a unitary storage box, but separable into individual uncomplex chambers. The food storage device also includes a unique beverage pouring spout, a thermal heating unit for use with an electrical current to provide heat to the various chambers, and a coupling strap for coupling said chambers together, holding then rigidly to form a unitary food storage device. The chambers are arranged and coupled together in a stacked relationship forming tiers, with each separate level providing an independant storage chamber, one of said chambers having a thermal heating unit embedded in one of its side walls and base and another having an integrated spout at one end for the pouring of said beverages. Heat from the thermal unit in the beverage chamber will warm foods placed in the other separated chambers. A carrying handle in the top chamber cover is provided and also includes an electric cord storing means, which serves as a base for the top chamber when inverted and used as a bowl. The location of the thermal heating unit embedded in the lower chamber allows for immersing in water to provide cleaning of the lower chamber without damaging the heating unit. Each storage chamber is formed by the coupling together of an upper tier to the lower tier, each tier being molded to fit together in an entire unit. Thus, each tier represents a bottom of a storage chamber while being the top of the storage chamber below it, which when broken down allows for easy cleaning while at the same time providing segregated chambers for a variety of different types of foods which may be heated.

It is an object of this invention to provide an improved heated lunch box, which has secondary uses in the home.

Applicant's invention provides for the simultaneous heating of both liquid and solid food, a liquid dispenser spout, an immersible heating unit and a plurality of detachable chambers arranged in a neat, compact unit. Hot meals and beverages are available during the day with minimum effort. The lunch box may be utilized as a storage box for the foods and beverages and kept in a refrigerator or freezer until time of use (for example, frozen dinners and left-overs) or used as a conventional lunch box for sandwiches and the like without using its heating ability.

It is another object of this invention to provide a heated lunch pail having separate, severable food storing chambers that may be broken down into individual wall portions that are individually cleanable.

It is yet another object of this invention to provide a lunch pail for carrying beverages that may be heated and poured directly from a lunch pail without breaking it apart.

And, still yet another object of this invention is to provide a food storage and carrying device having provision for storing different types of food and beverages that may be heated while being kept separated in individual food chambers in a compact and light-weight food carrying device.

And, still yet another object of this invention is to provide a compact lunch box having a thermal unit that is immersible and provides for a cord storage device that also serves as a base for a bowl when inverted.

BRIEF DESCRIPTION OF THE DRAWING

The Drawing is an exploded, partially cut-away view showing the separate tiers of Applicant's invention molded of thermo plastic and a cartridge type of immersible thermal unit.

PREFERRED EMBODIMENT OF THE INVENTION

Referring now to the drawing, Applicant's lunch box 10 is shown in an assembling posture having a base 12, a first tray 14, a second tray 16, and a cover 18, each stacked one upon the other from bottom to top respectively. A holding strap 26 extends up and over the stacked trays and cover, and is removeably coupled on each side of the base 12. A handle 24 is provided for carrying the lunch box and is attached over the cover. An elliptical flange 22 protrudes about the cover for wrapping and storing an electrical cord when not in use, and serves as a base for the said cover when inverted and used as a bowl. A cup 20 is housed upon the top of the second tray 16 and is held in place by flanges protruding from second tray and the side wall of cover 18 with an assist from the electrical cord.

Still referring now to the drawing, Applicant's lunch box is shown exploded into its separate sections wherein the bottom chamber 12 is utilized for beverage storage and shows thermal heating unit 32 embedded in the bottom portion. The bottom chamber for beverages extends around the bottom portion. The bottom chamber for beverages extends around the bottom chamber for supporting the entire structure on a flat surface. Additional structural supports may be provided. The upper portion of the beverage chamber also provides a lip 38 that is engageable with a symmetrically shaped lower lip 40 on the above food tray extending about its perimeter. A middle food chamber tray 14 and spout 46 is shown as a unitary structure preferably molded with thermo-plastic in the shape of an eliptical bowl container and may be of variable size and shape to provide the proper depth and compartments for particular food stuffs, such as hot or cold sandwiches and the like, or mainly other foods such as a balanced meal that should be heated before eaten, whether it be refrigerated or frozen.

Upper food chamber 16 is molded in a unitary manner to provide a food storage chamber and a holding device for dry items such as tea, sugar, etc., while providing a cup for retaining means from the projections 42 emanating at one portion of the tray. The remainder of the space sealed under cover 18 may be used for other dry items such bread, buns, cake, etc. Again, lip portions are provided in both the lower or middle food chamber tray and the upper food tray portions, such that they are tightly engageable for a real or partial seal when engaged to enclose food in a chamber. The upper cover 18 is engageable with the upper food tray 16 and includes a handle 24, a cord retaining means and a bowl base 22 disposed about the handle, and a perimeter lip portion 44 engageable into the upper food tray. A beverage cup 20 is provided and is stored next to the cover on the upper chamber and is resiliently held in place by a flange 42.

The drawing also shows a spout 46 integrated with the food chamber 14 with its lower lip 40 symmetrically fitted to the top lip 38 of beverage chamber 12. This allows for the pouring of the beverage directly from lunch box without removal of the other trays and gives a symmetrical outline to the unit without the protrusion of a spout. An electrical male plug 48 is positioned in a hollow chamber 30 in the bottom beverage chamber and provides for receiving an electrical outlet plug to provide electricity through prongs into the heating unit 32 embedded in the base portion of the beverage chamber. The electrical cord 50, when not in use, is stored by wrapping it around the exterior perimeter of the base of cover/bowl 18 which is a shaped flange 22 emanating from the cover 18.

In operation, the night before, left-over food from supper or a frozen meal may be placed in various chambers provided for in the lunch pail and a beverage such as soup, coffee, tea, or water may be placed in the bottom liquid receiving chamber and all chambers sealed together and strapped tightly by the overlapping strap. The box is then placed in the refrigerator over night and the next day is taken to work with the convenience of being able to take a hot lunch to work without having to pre-heat it before leaving; and where, just prior to eating lunch, an electrical plug is inserted in the appropriate electrical receptical and the beverage allowed to heat up prior to eating. In addition, heat will rise, heating other food stuffs place above the liquid. The liquid may then be poured from the spout into the cup which has been removed, while food may be consumed from each tray and in stages while eating foods at different levels. Upon returning home, the device may be completely broken into separate unitary trays and easily cleaned.

The instant invention has been shown and described herein, in what is considered to be the most practical and preferred embodiment. It is recognized, however, that departures may be made therefrom within the scope of the invention and that obvious modifications will occur to a person skilled in the art.

What I claim is:

1. A portable container for storing and heating food and beverages comprising:

a base liquid receiving container of a thermally insulated material having an open top portion;

an electrical heating means integrally disposed within said base container; and having electrical terminals extending through the insulated wall of said base container first storage tray removably coupled upon and over said base container opening, said first tray having raised wall portions of a thermally insulated material and a lower peripheral flange receivable onto the opening edge of said base container forming a seal between the first storage tray and the base container;

said first storage tray including and integral therewith a liquid receiving spout having its lower end receivable into said base container and its upper end opening without the exterior of said portable container;

second storage tray removably coupled upon the upper edge of said first storage tray walls, said second tray having a flanged perimeter interlockable with the upper wall edge of said first storage tray forming a seal there around;

a cover of a thermally insulated material removably coupled to said second storage tray and including a flanged raised wall portion protruding from the top of said cover for receiving and wrapping an electrical cord; and flexible means connected to said cover and engageably connectable to said base container for coupling said base container, said first storage tray, said second storage tray and said cover together in a stacked arrangement.

2. A portable container, as in claim 1, including: a handle connected to the top of said cover.

* * * * *